United States Patent
Wilson

(10) Patent No.: US 9,806,828 B2
(45) Date of Patent: Oct. 31, 2017

(54) RADIO FREQUENCY GENERATOR AUTOMATED TEST SYSTEM

(71) Applicant: Frontier Engineering, LLC, Berthoud, CO (US)

(72) Inventor: David R. Wilson, Platteville, CO (US)

(73) Assignee: Frontier Engineering, LLC, Berthoud, CO (US)

( * ) Notice: Subject to any disclaimer, the term of this patent is extended or adjusted under 35 U.S.C. 154(b) by 0 days.

(21) Appl. No.: 15/437,392

(22) Filed: Feb. 20, 2017

(65) Prior Publication Data
US 2017/0244500 A1     Aug. 24, 2017

Related U.S. Application Data

(60) Provisional application No. 62/299,490, filed on Feb. 24, 2016.

(51) Int. Cl.
| H04B 17/10 | (2015.01) |
| H04B 17/16 | (2015.01) |
| H04B 17/17 | (2015.01) |

(52) U.S. Cl.
CPC ........... *H04B 17/103* (2015.01); *H04B 17/16* (2015.01); *H04B 17/17* (2015.01)

(58) Field of Classification Search
CPC ....... H04B 17/103; H04B 17/16; H04B 17/17
See application file for complete search history.

(56) References Cited

U.S. PATENT DOCUMENTS

| 121,895 | A | | 12/1871 | Porter |
| 4,680,538 | A | * | 7/1987 | Dalman ................. G01R 27/04 324/601 |
| 5,384,541 | A | * | 1/1995 | Chu ................. G01R 31/31937 324/533 |
| 8,340,167 | B2 | | 12/2012 | Feng et al. |
| RE43,918 | E | | 1/2013 | Tuttle et al. |
| RE43,935 | E | | 1/2013 | Tuttle et al. |
| RE43,940 | E | | 1/2013 | Tuttle et al. |
| 8,378,702 | B2 | | 2/2013 | Boudreau et al. |
| 8,405,559 | B2 | | 3/2013 | Partee et al. |
| 8,447,296 | B2 | | 5/2013 | Ober et al. |
| 8,472,883 | B2 | | 6/2013 | Olesen et al. |
| 8,513,963 | B2 | | 8/2013 | Chen et al. |
| 8,537,562 | B1 | | 9/2013 | Bowie et al. |
| 8,558,625 | B1 | | 10/2013 | Lie et al. |
| 8,576,129 | B2 | | 11/2013 | Partee et al. |
| 8,615,229 | B2 | | 12/2013 | Mehio et al. |
| 8,648,770 | B2 | | 2/2014 | Schneider et al. |
| 8,670,755 | B2 | | 3/2014 | Knezevic |
| 8,686,736 | B2 | | 4/2014 | Forstner |
| 8,694,276 | B2 | | 4/2014 | Sontakke et al. |

(Continued)

OTHER PUBLICATIONS

U.S. Appl. No. 62/299,490, filed Feb. 24, 2016.

*Primary Examiner* — Tuan Pham
(74) *Attorney, Agent, or Firm* — Craig R. Miles; CR MILES P.C.

(57) ABSTRACT

A test system for monitoring the performance of a radio frequency signal generator is introduced. The system operates to predict approaching or imminent failure of the radio frequency generator. The system includes a directional coupler, a first detector, a second detector, and a processor to collect, process, and analyze data from the radio frequency generator under test.

15 Claims, 8 Drawing Sheets

(56) References Cited

U.S. PATENT DOCUMENTS

| | | |
|---|---|---|
| 8,704,575 B2 | 4/2014 | Hur et al. |
| 8,724,558 B2 | 5/2014 | Yu |
| 8,737,929 B2 | 5/2014 | Cohen et al. |
| 8,744,368 B2 | 6/2014 | Kothari et al. |
| 8,756,565 B2 | 6/2014 | Graf et al. |
| 8,781,403 B2 | 7/2014 | Olesen et al. |
| 8,788,882 B2 | 7/2014 | Schroeder et al. |
| 8,797,056 B2 | 8/2014 | Khoche et al. |
| 8,799,853 B2 | 8/2014 | Brown et al. |
| 8,803,198 B2 | 8/2014 | Smith et al. |
| 8,803,531 B2 | 8/2014 | Arvidsson |
| 8,810,460 B2 | 8/2014 | Jimenez et al. |
| 8,813,032 B2 | 8/2014 | Graf et al. |
| 8,816,915 B2 | 8/2014 | Partee et al. |
| 8,923,372 B2 | 12/2014 | Yang et al. |
| 8,924,949 B2 | 12/2014 | Graf et al. |
| 8,927,069 B1 | 1/2015 | Estinto et al. |
| 8,938,716 B2 | 1/2015 | Graf et al. |
| 8,982,936 B2 | 3/2015 | Yang et al. |
| 8,983,394 B2 | 3/2015 | Deforge et al. |
| 9,000,788 B2 | 4/2015 | Pagani |
| 9,024,839 B2 | 5/2015 | Schneider et al. |
| 9,031,514 B2 | 5/2015 | Olesen et al. |
| 9,041,421 B2 | 5/2015 | Peng et al. |
| 9,084,124 B2 | 7/2015 | Nickel et al. |
| 9,093,755 B2 | 7/2015 | Faxvog et al. |
| 9,094,056 B2 | 7/2015 | Ouyang et al. |
| 9,135,131 B2 | 9/2015 | Schroeder et al. |
| 9,166,302 B2 | 10/2015 | Cohen et al. |
| 9,166,706 B2 | 10/2015 | Forstner |
| 2016/0103166 A1* | 4/2016 | Szafraniec ............. G01R 27/28 324/638 |

\* cited by examiner

FIG. 6

Test- Results

| Results | Generator Settings | Test Settings | Help |

Pulse Test- Threshold: 4.0%

| Setpoint | Avg RFG | Std RFG | Max RFG | Avg Meas | Std Meas | Max Meas | Pass/Fail |
|---|---|---|---|---|---|---|---|
| 304.8 | 293.55 | 2.93 | 300.87 | 299.99 | 9.85 | 324.26 | ✓ |
| 601.2 | 587.42 | 4.58 | 596.52 | 601.19 | 19.89 | 657.39 | ✓ |
| 903.6 | 892.29 | 4.81 | 904.35 | 921.21 | 31.01 | 968.59 | ✓ |
| 1197.6 | 1197.23 | 5.39 | 1210.43 | 1190.88 | 71.46 | 1363.49 | ✓ |
| 1505.4 | 1504.35 | 5.86 | 1520.0 | 1552.49 | 72.93 | 1752.12 | ✓ |
| 1811.4 | 1811.96 | 6.67 | 1829.57 | 1857.48 | 75.86 | 2055.28 | ✓ |
| 2076.0 | 2121.77 | 7.67 | 2139.13 | 2070.4 | 134.32 | 2410.89 | ✓ |

Exit | Status: Idle | Save | Start

FIG. 7

Test- Results

| Results | Generator Settings | Test Settings | Help |

VSWR TEST

| Benchmarks | Measurements |
|---|---|
| Trip Setpoint (V) | 1.028082 |
| FWD Measured (W) | 294.474449823 |
| REF Measured (W) | 351.541831875 |
| FWD RFG (W) | 295.114100408 |
| REF RFG (W) | 306.289828729 |
| Total Foldback Measured (W) | 646.016281698 |
| Total Foldback RFG (W) | 601.403929138 |
| Pass/Fail | ✓ |

Exit | Status: Idle | Save | Start

RADIO FREQUENCY GENERATOR AUTOMATED TEST SYSTEM

This United States Non-Provisional patent application claims the benefit of U.S. Provisional Patent Application No. 62/299,490, filed Feb. 24, 2016, hereby incorporated by reference herein.

I. BACKGROUND

Manufacturers of integrated circuits ("IC") and thin film coatings ("TFC") are reliant upon accurately controlled plasma processes. Current plasma processes use an extensive variety of high power radio frequency ("RF") generators. The majority of the RF generators operate in the high frequency ("HF") spectrum between about 0.3 megahertz ("MHz") to about 30 MHz. RF power levels typically range from about 10 watts ("W") to about 10 kilowatts ("kW"), or more, depending upon material processing requirements. Water cooling is normally used for RF generators which provide power output levels above 1 kW.

IC and TFC companies generally process materials twenty-four hours a day without any planned maintenance for the RF generators, they simply wait until an RF generator fails. When an RF generator fails during material processing, the cost can be significant due to material processing down time and damaged thin film coatings on products.

Because the majority of IC and TFC companies use RF generators that are more than ten years old, and due to the high cost of re-tooling, they will continue to do so until an RF generator can no longer be relied upon and is finally scrapped due to end of life failure rate escalation. There would be a substantial advantage in having an apparatus and method to test, in situ, the performance of an RF generator and preferably without having to remove the RF generator from material processing during performance testing. The apparatus and method of testing the performance of an RF generator would provide a significant improvement in material processing reliability along with a substantial cost savings.

II. SUMMARY OF THE INVENTION

Accordingly, a broad object of particular embodiments of the invention can be to provide an RF generator test apparatus which can be connected to an RF generator, in situ, to provide a detailed performance analysis of such RF generator without having to remove the RF generator from material processing.

Another broad object of particular embodiments of the invention can be to provide an RF generator test apparatus that operates to help predict approaching or imminent failure of an RF generator under test allowing the manufacturer to remove the RF generator from material processing before it fails, thereby reducing or avoiding material processing down time, damage to thin film coatings on products, or further damage to the RF generator.

Naturally, further objects of the invention are disclosed throughout other areas of the specification, drawings, photographs, and claims.

III. A BRIEF DESCRIPTION OF THE DRAWINGS

FIG. 6 illustrates an example of a user interface display screen, including a results page showing tabularized results of a pulse test for conducting a performance analysis of a radio frequency generator.

FIG. 7 illustrates an example of a user interface display screen, including a results page showing tabularized results of a VSWR test for conducting a performance analysis of a radio frequency generator.

IV. DETAILED DESCRIPTION OF THE PREFERRED EMBODIMENTS

Figure 1:
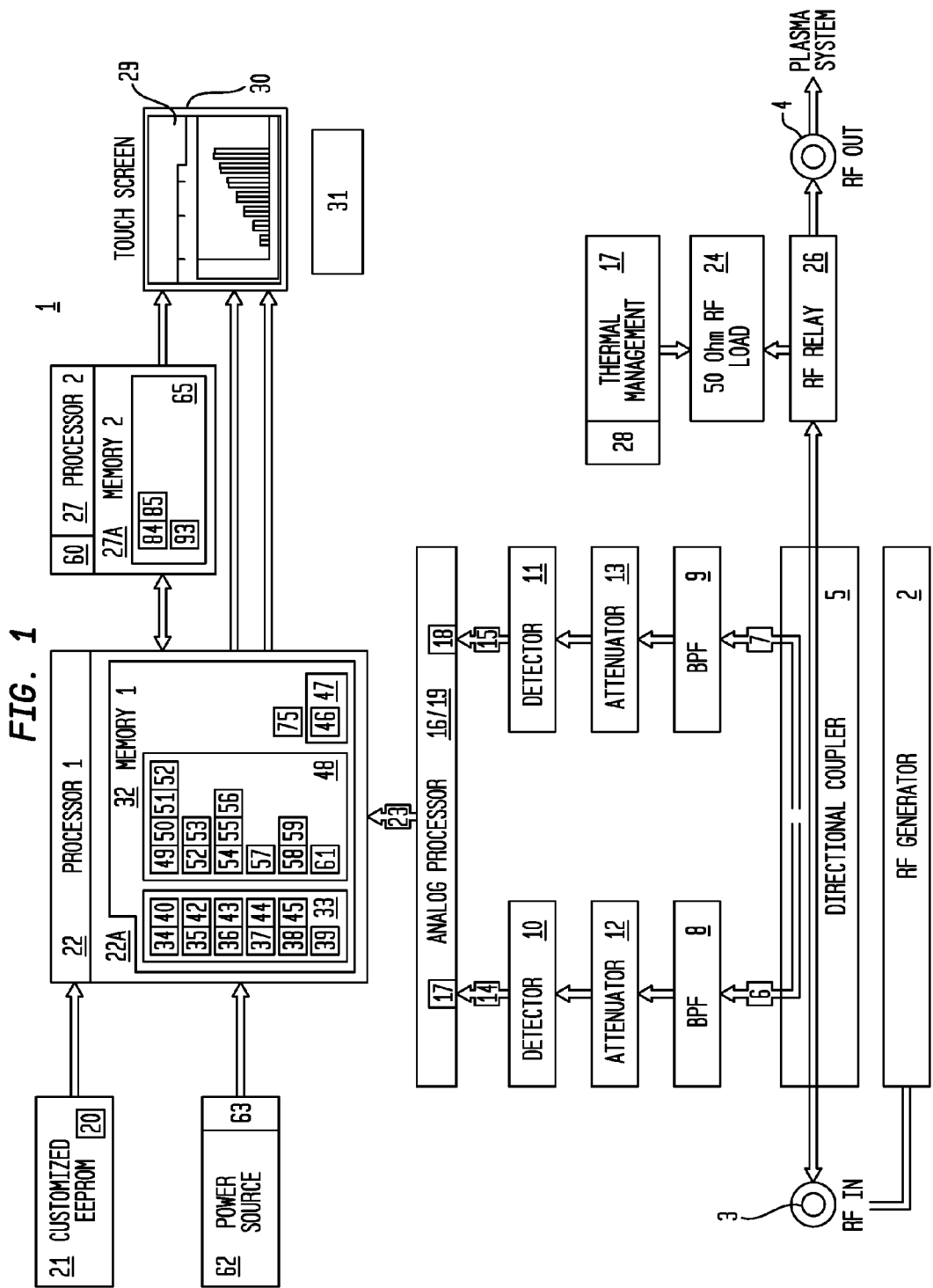
FIG. 1 is a schematic diagram of an example system for conducting a performance analysis of a radio frequency generator.
Figure 2:
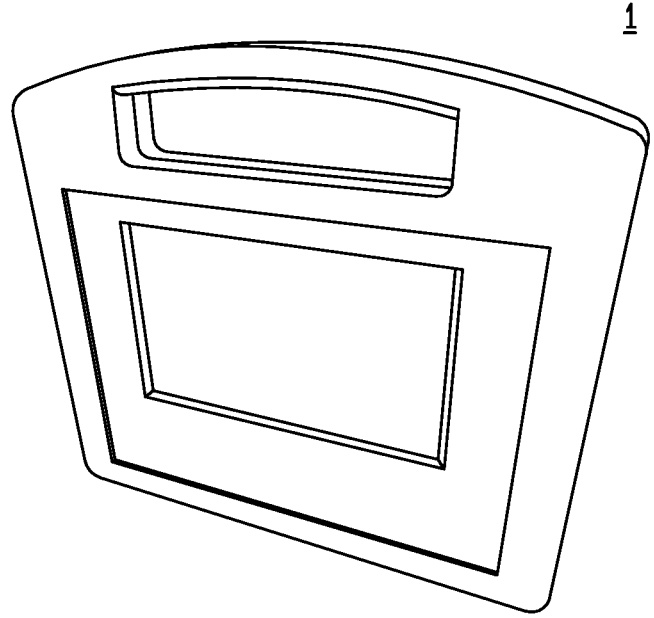
FIG. 2 is a perspective view of an example radio frequency generator test apparatus.
Figure 3:
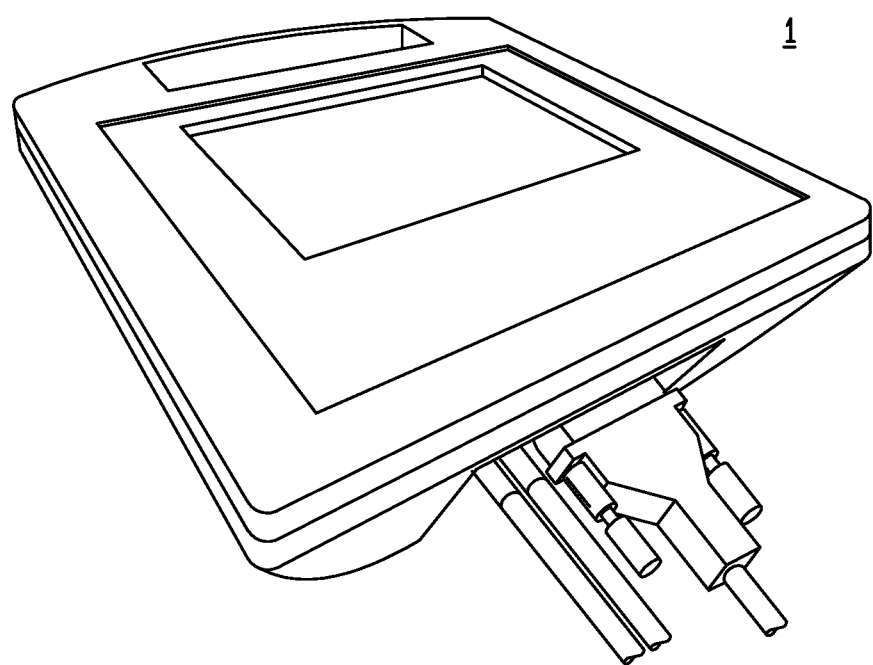
FIG. 3 is a perspective view of an example radio frequency generator test apparatus.
Figure 4:
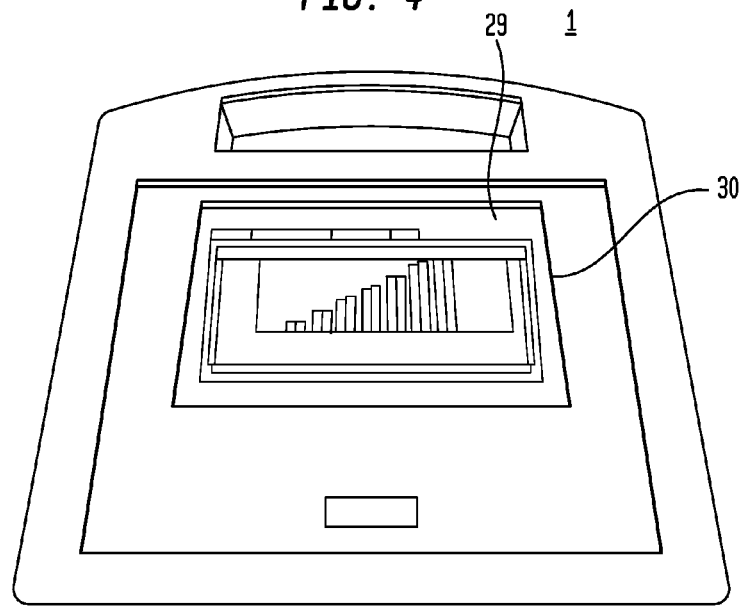
FIG. 4 is a front view of an example radio frequency generator test apparatus, including a display screen which illustrates a particular page of a graphical user interface.

Now referring to FIG. 1, a schematic diagram shows an example system, including an RF generator test apparatus (1) which, when connected to an RF generator (2), in situ; e.g., as a device under test ("DUT"), can be used for conducting a performance analysis of the RF generator (2). As to particular embodiments, the RF generator test apparatus (1) can be connected to the RF generator (2), in situ or DUT without having to remove the RF generator (2) from material processing. The RF generator test apparatus (1) also operates to help predict approaching or imminent failure of the RF generator (2). This predictive capability of the RF generator test apparatus (1) may enable the manufacturer to remove the RF generator (2) from material processing before it fails, thereby reducing or avoiding material processing down time, damage to thin film coatings on products, or further damage to the RF generator (2).

Embodiments of the RF generator test apparatus (1) include a radio frequency Input connector (3) and a radio frequency Output connector (4) for connection to the RF generator (2). A directional coupler (5) isolates and separates a radio frequency forward signal (6) (the RF signal moving toward the load) from a radio frequency reflected signal (7) (the RF signal moving in the opposite direction) attenuated by −40 decibels ("dB") from the main RF energy line. A directional coupler (5) suitable for use in embodiments of the invention can be fabricated using printed circuit techniques onto a copper clad ceramic carrier. The use of ceramic helps to minimize problems due to temperature variations and RF absorption heating effects that occur over time with FR4 grade glass-reinforced epoxy laminate and similar circuit board materials. The coupling coefficient can be selected to suit the operational frequency and RF output power level of the RF generator (2) under test.

Each of the RF forward signal (6) and the RF reflected signal (7) correspondingly pass through an RF forward signal band-pass filter (8) and an RF reflected signal band-pass filter (9) to remove out of band energy that would create measurements errors if it were passed through to the corresponding RF forward signal detector (10) or RF reflected signal detector (11). An RF forward signal band-pass filter (8) suitable for use in embodiments of the invention can be fabricated from inductors and capacitors available from the Digi-Key Corporation, 701 Brooks Avenue South, Thief River Falls, Minn. 56701. The elliptic (Cauer) filters can have the following characteristics: center frequency to be the same as the RF generator (2) under test. Similarly, an RF reflected signal band-pass filter (9) suitable for use in embodiments of the invention can be fabricated from inductors and capacitors available from the Digi-Key Corporation, 701 Brooks Avenue South, Thief River Falls, Minn. 56701. The elliptic (Cauer) filters can have the following characteristics: center frequency to be the same as the RF generator (2) under test.

An RF forward signal attenuator (12) can be disposed between the RF forward signal band-pass filter (8) and the RF forward signal detector (10) and an RF reflected signal attenuator (13) can be disposed between the RF reflected signal band-pass filter (9) and the RF reflected signal detector (11). The combined RF energy loss of the RF forward signal (6) and the RF reflected signal (7) created by the negative coupling coefficient of the directional coupler (5), the respective RF forward signal band pass filter (8) or RF reflected signal band pass filter (9) insertion loss and the respective RF forward signal attenuator (12) and RF reflected signal attenuator (13) ensures that the maximum RF energy at the input to each of the RF forward signal detector (10) and the RF reflected signal detector (11) will be well within the respective operating range of the RF forward signal detector (10) and the RF reflected signal detector (11) when the maximum RF energy output is produced by the RF generator (2) under test. An RF forward signal attenuator (12) suitable for use in embodiments of the invention can be fabricated from resistors available from the Digi-Key Corporation. The design of the attenuator requires an input and output impedance=50Ω and component values selected to ensure that the signal amplitude arriving at the input to each of the RF forward signal detector (10) and the RF reflected signal detector (11) does not drive them out of their linear operating range.

Each of the RF forward signal detector (10) and the RF reflected signal detector (11), are fabricated using high linearity integrated circuits which measure the corresponding RF forward signal (6) and RF reflected signal (7) and generate direct current analog voltage outputs (14)(15) that vary proportional to the respective levels of RF forward signal (6) and RF reflected signal (7). An RF forward signal detector (10) and an RF reflected signal detector (11) suitable for use in embodiments of the invention can be obtained from Analog Devices, Inc., One Technology Way, P. O. Box 9106, Norwood, Mass. 02062.

The analog voltage outputs (14)(15) of the RF forward signal detector (10) and the RF reflected signal detector (11) can be connected to a programmable analog signal filter (16). The programmable analog signal filter (16) includes a first input (17) for receiving the RF forward signal detector analog voltage output (14) and a second input (18) for receiving the RF reflected signal detector analog voltage output (15). A programmable analog filter (16) suitable for use in embodiments of the invention can be fabricated from components available from the Digi-Key Corporation. The filtered signal output profile (19) of the programmable analog signal filter (16) corresponds to any low frequency components that may be modulating the RF envelope. The filters' response is selectively controlled based upon RF generator characteristic data (20) of the RF generator (2) under test. The RF generator characteristic data (20) can be stored in a programmable memory element (21) such as an electrically erasable programmable read-only memory ("EEPROM"). A programmable memory element (21) suitable for use in embodiments of the invention can be obtained from Digi-Key Corporation. A first processor unit (22) communicatively coupled to the programmable memory element (21) can operate to configure or reconfigure the filtered signal output profile (19) of the programmable analog signal filter (16) based upon the stored characteristic data (20) of the RF generator (2) under test. A first processor element (22) suitable for use in embodiments of the invention can be a Texas Instruments AM335 ARM processor. The programmable analog signal filter (16) operates to isolate particular analog signal frequencies (23) correlated with the RF forward signal (6) and the RF reflected signal (7) of the RF generator (2) under test.

To ensure that errors due to load mismatch do not occur, in some implementations, a 50Ω (Ohm) non-reactive load (24) is contained within the RF generator test apparatus (1). The non-reactive load (24) is comprised of three high power 150Ω (Ohm) RF load resistors (25) connected in parallel to provide the 50Ω, non-reactive load required. This ensures that the RF reflected signal (7) remains very close to zero during the RF generator (2) test sequence, this enables high accuracy RF forward signal (6) measurements to be made more rapidly by eliminating computations that would be needed if a reactive load were used.

To test RF generators (2) that contain a detection circuit, also known as a fold-back circuit to protect against damage due to an excessively high voltage standing wave ratio ("VSWR"), a relay (26) can be included, in some implementations, to alter the 50Ω non-reactive load (24). When this optional test is activated, the RF generator power output is ramped slowly up to the trip point of that particular family of generators. For example, a generator which requires the RF reflected signal (7) to be limited to 600 W would limit the RF forward signal (6) power to 600 W, if the load were to become open or short circuit, either of which would create a 100% power reflection.

In the case where the load impedance changes by less than 100% of the optimum 501 then the RF forward signal (6) power may be increased to a level (e.g., 1100 W) where the RF reflected signal (7) power approaches 600 W and the RF generator (2) then limits the RF forward signal (6) power at that level. As mentioned above, this test is optional because a large number of RF generators (2) do not provide such a protection scheme and to apply a load impedance that would create high VSWR may cause unnecessary stress to the RF output circuits.

Temperature monitoring circuits (17) within RF generator test apparatus (1) can temporarily disable the operation of an RF generator (2) if the temperature of the internal RF load resistors (25) exceeds the safe operating limit. Internal fans

(28) provide cooling airflow which keeps a temperature monitoring circuits (17) reset while the temperature is at a safe level.

Direct current ("DC") power can be supplied from an external source or from an internal power source (62) which as to certain embodiments can take the form of a rechargeable battery.

Again referring primarily to FIG. 1, the first processor unit (22) functions to collect, process, and analyze data from the RF generator (2) under test and a second processor unit (27) functions to display a graphical user interface (29) on a display surface (30) of the RF generator test apparatus (1) in which a user (31) can input various parameters and view analyzed data.

The first processor unit (22) can further include a first memory element (22A) containing one or more program modules (32) relating to an initial RF generator test (33), as follows:

In some implementations, the interlock loop module (34) sets a digital voltage that will enable the interlock loop on the RF generator (2) under test. The interlock loop module (34) can be executed to check the interlock return to confirm that an interlock loop has been established between the RF generator test apparatus (1) and the RF generator (2) under test. If a return voltage is discovered, the interlock loop module (34) infers that the interlock loop is functioning. The program records the interlock status as "Pass." If no return voltage is discovered, the program raises an error flag, records the error, and records the interlock status as "Fail."

In some implementations, the alternating current on module (35) checks the AC status from the RF generator (2) under test for a "LOW" value. The alternating current on module (35) can be executed to confirm that DC voltages that are available at the interface connector are present (for example +24 V and +15 V rails). If these three conditions are met, the alternating current on module (35) infers that the AC is on. The program records the AC status as "Pass." If any condition fails, the program raises an error flag, records the error, and records the AC status as "Fail."

In some implementations, the RF "ON" module (36) can be executed to set the RF pulse width to 0, disabling the RF On command. The RF "ON" module (36) checks the RF "ON" status voltage from the RF generator (2) under test. If the value is "HIGH" then RF is off. The program records the RF status as "Pass." If the value is "LOW" then RF is "ON". The program raises an error flag, records the error, and records the RF status as "Fail."

In some implementations, the Setpoint Status alarm module (37) can be executed to check the Setpoint Status alarm from the RF generator (2) under test. If the value is "HIGH" then the Setpoint Status alarm is off. The program records the set point status as "Pass." If the value is "LOW" then the Setpoint Status alarm is on. The program raises an error flag, records the error, and records the set point status as "Fail."

In some implementations, the "Over Temperature" alarm module (38) checks the "Over Temperature" alarm from the RF generator (2) under test. If the value is "HIGH", then the "Over Temperature" alarm is off. The program records the over temperature status as "Pass." If the value is "LOW" then the "Over Temperature" alarm is on. The program raises an error flag, records the error, and records the over temperature status as "Fail."

In some implementations, the results summary module (39) can be executed to loop through the status for each of the "Interlock" test (40), the "AC ON" test (42), the "RF ON" test (43), the "Setpoint Status" alarm test (44), and the "Over Temperature" alarm test (45) and polls the status of each test (either "Pass" or "Fail"). The results summary module (39) further functions to deliver the test data to the second processor unit (27) for display on the display surface (30) of the RF generator test apparatus (1). The results summary module (39) further functions to save the test data (46) to a test results database (47) for the RF generator (2) under test.

Now referring primarily to FIG. 1, the first processor unit (22) can further include one or more program modules (32) relating to primary RF generator tests (48), as follows:

In various implementations, the RF pulse test module (49) can be executed to conduct an RF pulse test (50) of an RF generator (2) under test. In this regard, the RF pulse test module (49) can be executed to establish a timer thread to synchronize all threads to ensure that two or more concurrent processes do not simultaneously execute a program segment. The RF pulse test module (49) then functions to send a voltage that enables the interlock loop between the RF generator test apparatus (1) and the RF generator (2) under test, sends a voltage that sets the set point to the desired power level, sends a pulse width modulation ("PWM") signal (51) that controls the RF pulse width "ON" command, and then starts a watchdog timer, in case the RF pulse test (50) hangs or freezes. The RF pulse test module (49) can be executed to continuously check the RF on status to ensure that power is being applied. Once the RF "ON" status is confirmed the RF pulse test module (49) functions to start a timer (52) to generate the desired RF pulse width and RF pulsing and enables the synchronization event in order to start the recording and alarm monitoring thread. Once the timer (52) expires the program disables the pulsing and interlock loop and clears the synchronization event.

The RF pulse test module (49) can be further executed to provide a record thread which waits for the thread synchronization event and once the event is enabled, the thread begins recording data until the event is cleared. In part the record thread includes the RF generator's (2) reported RF forward signal (6) power and RF reflected signal (7) power as well as the RF forward signal (6) and RF reflected signal (7) power passing through the directional coupler (5). Once the event is cleared, the recorded data is saved.

The RF pulse test module (49) can be further executed to provide an alarm monitor thread which waits for the synchronization event to be set. Once the event is enabled, the alarm monitor thread continuously checks the "Setpoint" status alarm and "Over Temperature" alarms. If a "LOW" value is discovered, an error flag is raised and the error is recorded. Once the event is cleared, the data is saved.

The RF pulse test module (49) can be further executed to convert data by looping through the recorded data and converting the data from Volts to Watts.

The RF pulse test module (49) can be further executed to analyze RF pulse test (50) data. In this regard, the RF pulse test module (49) functions to load the converted data, any alarm flags, and the set points. The RF pulse test module (49) can be further executed to calculate and record the mean, standard deviation, and maximum value of the RF forward signal (6) power for each set point, compares the mean RF forward signal (6) power to the threshold RF forward signal (6) power, and compares the RF reflected signal (7) power to the maximum RF reflected signal (6) power limit. If both values are in range, the program records a "Pass" status for the set point. If not, the program records a "Fail" status for the set point.

The RF pulse test module (49) can be further executed to display results of the RF pulse test (50). In this regard, the RF pulse test module (49) sends the data and status to the second processor unit (27) to display the RF pulse test (50) results on the display surface (30) of the RF generator test apparatus (1). For example, the RF pulse test module (49) can store the mean, standard deviation, maximum power, and set point status (pass or fail) in a table for viewing and adds the mean power to a running average for the RF generator (2) under test and adds all recorded data to the test results database (47) for the RF generator (2) under test.

In various implementations, the voltage standing wave ratio ("VSWR") test module (52) can be executed to perform a trip point test (53) which sends a "LOW" voltage in order to turn off the relay (26), removing part of the internal load. The test module formats the set point to 0 and enables the interlock loop and enables the RF "ON" and increments the setpoint until the "Setpoint Status" alarm enables, or until the maximum reflected power level is reached. If the "Setpoint Status" alaim is triggered, the current set point is recorded as the trip point and the RF on command is disabled. If a trip point is not found, the program immediately sets the status as "Fail" and ends the test.

The VSWR test module (52) can be further executed to record data for the trip point test (53) where the set point is set to 0.8× (Trip Point). The "RF ON" command is enabled and data is recorded using the record thread of the RF pulse test module (49). The "RF ON" command is disabled. The "Set Point" is then increased to the trip point and the "RF ON" command is enabled. Data is recorded using the record thread of the RF pulse test module (49). The "RF ON" command is disabled. The "Set Point" is adjusted to 1.2 times the Trip Point voltage. The "RF ON" command is enabled. Data is recorded using the record thread of the RF pulse test module (49). The "RF ON" command is then disabled.

The VSWR test module (52) can be further executed to analyze to the data from the trip point test (53). In this regard, the VSWR test modules' (52) function is to calculate the mean RF reflected signal (7) and RF forward signal (6) power for each set point listed above. Convert the data from volts to watts. Compare the total fold back to the threshold value. If the value is below the threshold, record the "Pass" test status. If otherwise, record the "Fail" test status.

The VSWR test module (52) can be further executed to generate a results summary by loading the mean recorded data, trip point, and test status. It generates and records the set point test (53) data in a table. It sends the set point test (53) data to the second processor unit (27) for display in the graphical user interface (29) on the display surface (30) of the RF generator test apparatus (1) and saves the set point test (53) data to the test results database (47) for the RF generator (2) under test. One embodiment of the RF Generator Test Apparatus can be connected "in-line" with the RF generator and used as a process monitor to evaluate the performance of the RF Generator and RF Load Match combination. The in-line monitor can provide useful information on RF power levels, settling time (i.e. the time taken to reduce the VSWR to acceptable levels).

In various implementations, the phase locked loop ("PLL") oscillator test module (54) can be executed to record data from the PLL oscillator test (55) by setting a clock generator (56) to the middle frequency between the upper and lower limits of the RF generator's PLL oscillator output and then starts a timer thread and timer event. The PLL oscillator test module (54) calculates and records the number of rising edges detected until the timer event is disabled then, increments the clock generator (56) by 1 kHz, records the data for analysis and repeat the steps until the clock generator (56) exceeds the high frequency limit of the RF frequency generator's PLL oscillator output. Next, test module (54) decrements the clock generator (56) by 1 kHz and records the data for analysis then, repeats the steps until the clock generator (56) exceeds the low frequency limit of the RF generator's PLL oscillator output.

The PLL oscillator test module (54) can further function to analyze data from the PLL oscillator test (55) calculating the RF frequency based on the number of edges detected and the time period for each data set recorded above and analyzes the recorded frequencies in comparison to the input frequency to determine the bandwidth of the RF generator's (2) PLL circuit and compares the calculated bandwidth to the threshold value. If the bandwidth is in range, the test status is set to "Pass." Otherwise the test status is set to "Fail."

The PLL oscillator test module (54) can further function to generate a results summary by loading the bandwidth and status and records PLL oscillator test (55) data in a table and sends the PLL oscillator test (55) data to the second processor unit (27) which functions to display the table in the graphic user interface (29) on the display surface (30) of the RF generator test apparatus (1) and saves the PLL oscillator test (55) data to a test results database (47) for the RF generator (2) under test.

In some implementations, the final test results summary module (57) can be executed to load all the error flags and all the test statuses obtained in the RF pulse test (49), the VSWR trip point test (53), and the PLL oscillator test (55). If any error flag or "Fail" status is found, the final test results summary module (57) considers the RF generator (2) under test to have failed testing, displaying a "Failure" notification and records the overall test status and saves it in the RF generator's database. If there are no errors the program considers the RF generator (2) under test to have passed testing, records the overall test status, and saves it in the test results database (47) displaying a "Pass" notification.

In some implementations, the transmission control protocol ("TCP") server socket module (58) functions to create a TCP server (59) and waits for a client to connect. The TCP server socket module (58) starts a thread for reading data and waits for data to be received from the TCP socket (60) on the second processor unit (27). Next, TCP server socket module (58) passes the data to the parse data function and writes data to the TCP socket (60) on the second processor unit (27). The TCP server socket module (58) further parses data into an array and records all parameters sent from the second processor unit (27) and initiates the appropriate tests.

In some implementations, the power monitor module (61) can be executed to monitor power level of the power source (62) of the RF generator test apparatus (1) by polling the power management integrated circuit (63) for the power source (62)(also referred to as a battery) power level. If the battery power level is under 20% capacity, the power monitor module (61) functions to raise a battery charge flag and sends the battery power level and charge flag to the second processor unit (27) which functions to display the battery power level (64) on the display surface (30) of the of the RF generator test apparatus (1). The power monitor module (61) can be further executed to monitor the power source charge and discharge rate to estimate the time remaining based on battery power level and discharge rate and sends the data to the second processor unit (27) for display on the display surface (30) of the RF generator test apparatus (1).

Figure 5:
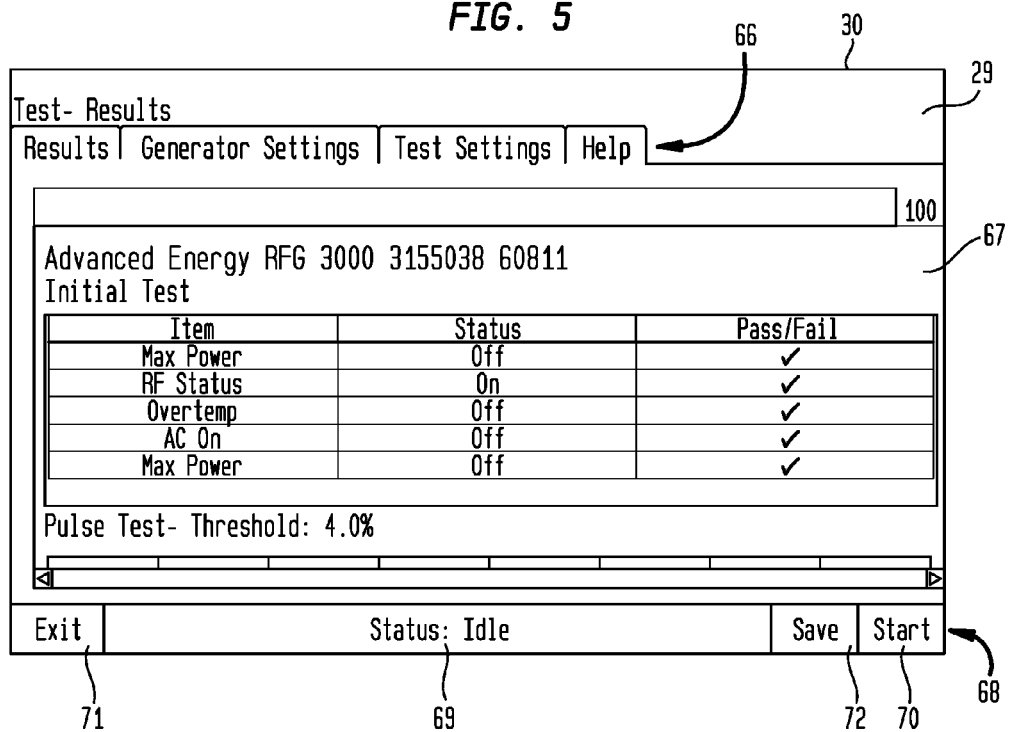
FIG. 5 illustrates an example of a user interface display screen, having a page section bar for conducting a performance analysis of a radio frequency generator.

Now referring primarily to FIGS. 1 to 11 the second processor unit (27) can include a second memory element (27A) containing a graphical user interface module (65)

executed to generate the graphical user interface (29) displayed on the display surface (30) of the RF generator test apparatus (1). The graphical user interface (29) can include a user interface page selection bar (66) (as shown in the examples of FIGS. 5 through 7), which allows the user (31) to select between a plurality of graphical user interface pages (67) and a menu bar (68) which includes a test status indicator (69), a start button (70), an exit button (71) and a save button (72) (as shown in the examples of FIGS. 5 through 7).

In some implementations, the second processor unit (27) can execute the graphical user interface module (65) to display a test status indicator (69) and to start a test status thread and check whether or not a test is currently being run by the RF generator test apparatus (1) and displays an "idle" notification if no tests are running or otherwise displays a "running" notification.

Figure 11:
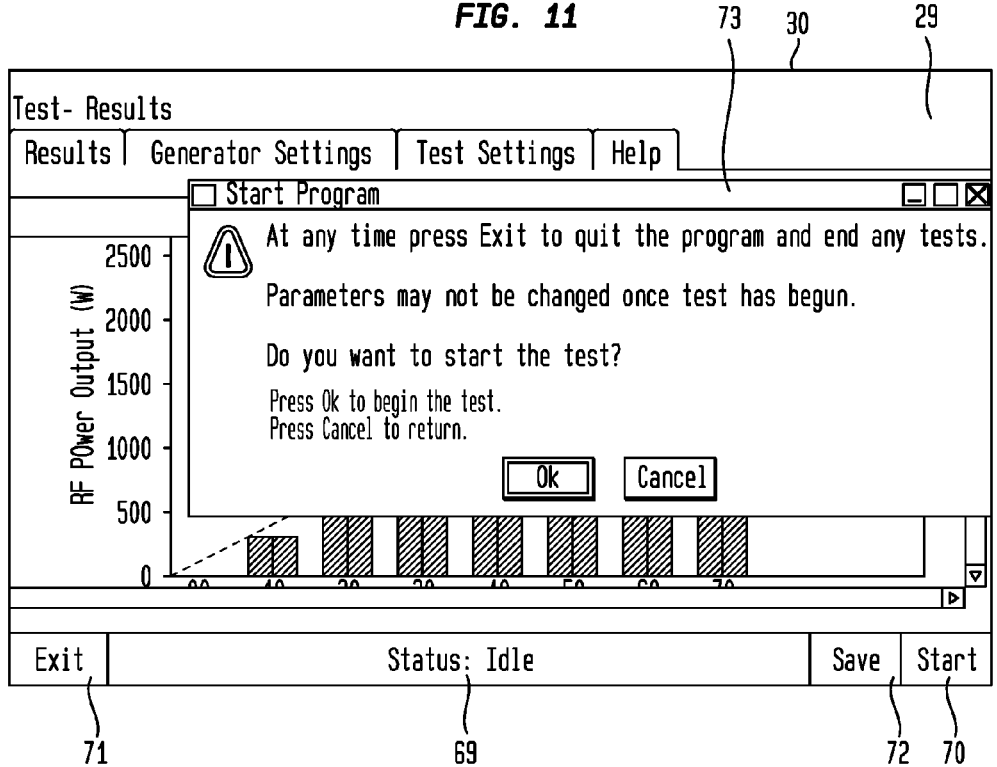
FIG. 11 illustrates an example of a user interface display screen, including a start test warning dialog for conducting a performance analysis of a radio frequency generator.
Figure 12:
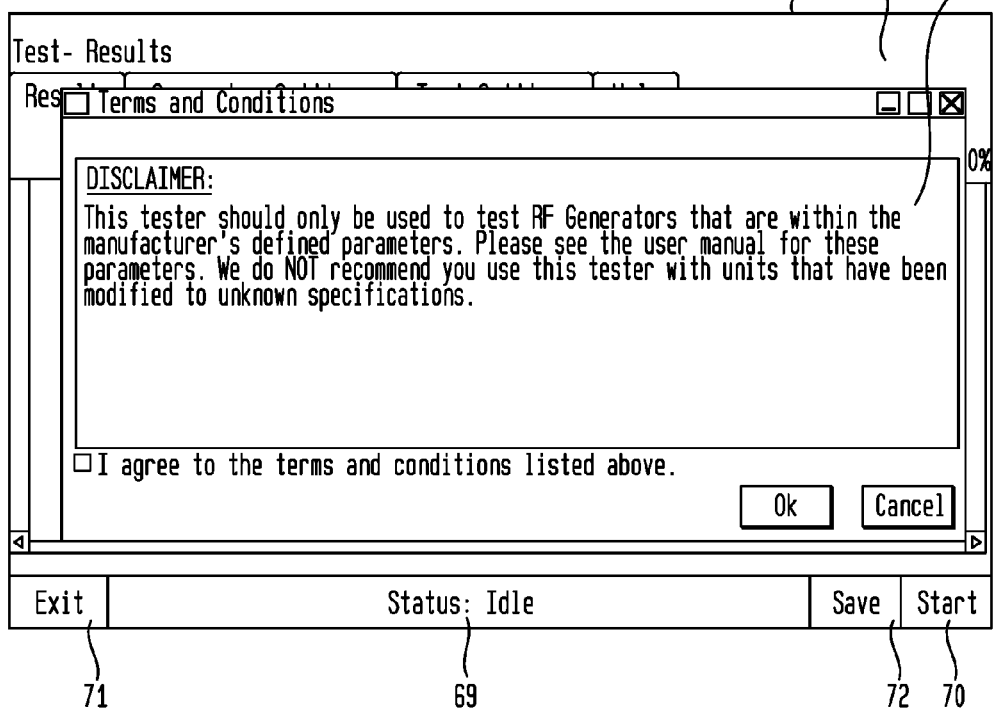
FIG. 12 illustrates an example of a user interface display screen, including a disclaimer dialog for conducting a performance analysis of a radio frequency generator.
Figure 13:
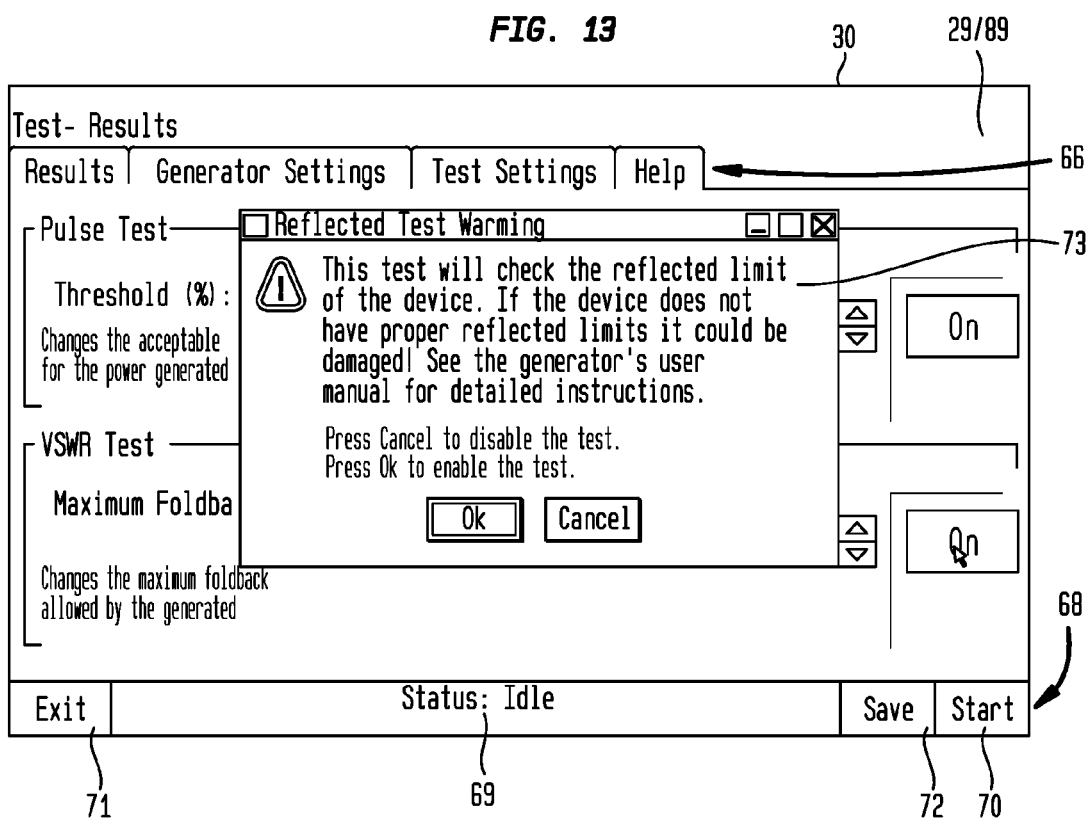
FIG. 13 illustrates an example of a user interface display screen, including a test dialog for conducting a performance analysis of a radio frequency generator.

In some implementations, the second processor unit (27) can execute the graphical user interface module (65) to display a start button (70) on the display surface (30) of the RF generator test apparatus (1) which by user interaction causes the second processor unit (27) to execute the graphical user interface module (65) to check that at least one test has been enabled in the test settings page (89)(as shown in the example of FIG. 13) of the graphical user interface (29) and creates and displays on the display surface (30) a warning dialog (73)(as shown in the example of FIG. 11). If the warning dialog (73) is accepted by user interaction in the graphical user interface (29), a disclaimer dialog (74) is created and displayed on the display surface (30). If the disclaimer dialog (74) is accepted by user interaction in the graphical user interface (29), the second processor unit (27) functions to connect to the first microprocessor (22) via the TCP socket (60). If a connection is established, it sends the RF generator test settings to the first microprocessor unit (22) and disables the start button (70) until the tests on the RF generator (2) under test end.

In some implementations, the second processor unit (27) further executes the graphical user interface module (65) to display a save button (72) on the display surface (30) of the RF generator test apparatus (1) which by user interaction causes the second processor unit (27) to save the information on the current page of the graphical user interface (29) to a configuration file (75) or test results database (47) for the RF generator (2) under test.

Figure 10:
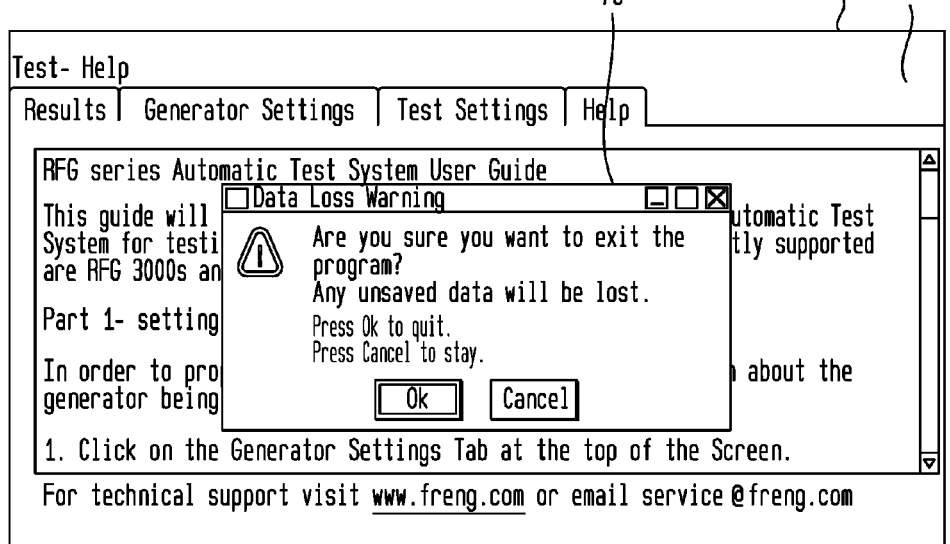
FIG. 10 illustrates an example of a user interface display screen, including an exit warning dialog for conducting a performance analysis of a radio frequency generator.

In some implementations, the second microprocessor (27) can further execute the graphical user interface module (65) to display an exit button (71) on the display surface (30) of the RF generator test apparatus (1) which by user interaction causes the second processor unit (27) to create and display a warning dialog (76) on the display surface (30) (as shown in the example of FIG. 10). If accepted by user interaction, the second processor unit (27) sends a stop command to the first processor unit (22) and exits the program.

In some implementations, the second microprocessor unit (27) can further execute the graphical user interface module (65) to display a results page (77) including one or more of a progress bar (78) and calculates the current test progress and displays the progress percentage for each of the initial RF generator tests (33) and the primary RF generator tests (48). If a test failure flag has been set, the progress bar turns red. The second processor unit (27) further functions to record and display the date, time, model number and serial number of the RF generator (2) under test.

In regard to the initial RF generator tests (33), the second processor unit (27) functions to wait for initial RF test data to be passed from first processor unit (22) and creates an initial RF test table (79) showing the function being tested, the expected status, and a pass or fail indicator and inputs initial RF test data into the initial RF test table (79) as it is received from the first processor unit (22).

In regard to the primary RF generator tests (48), the second processor unit (27) waits for the RF pulse test (50) data to be passed from the first processor unit (22) and creates a RF pulse test table (80) showing the set point, mean, standard deviation, and maximum value, and pass or fail indicator for the RF forward signal (6) power from the RF generator (2) under test and directional coupler (5) and inputs RF pulse test data into the RF pulse test data table (80) as it is received from first processor unit (22). The second processor unit (27) further functions to generate a RF pulse test data plot (81) by waiting for the running average data and current mean data for RF forward signal (6) power to be sent from the first processor unit (22) and creates the RF pulse test data plot (81) displaying the running average and mean for each set point.

In regard to the VSWR trip point test (53), the second processor unit (27) executes that graphical user interface module (65) and waits for VSWR trip point test data to be passed from first processor unit (22) and creates a trip point test table (82) showing the trip point, RF forward and RF reflected signal (6)(7) power from the RF generator (2) under test and the directional coupler (5), the total fold back, and a pass or fail indicator.

In regard to the PLL oscillator test (55), the second processor unit (27) executes the graphical user interface module (65) and waits for PLL oscillator test data to be passed from the first processor unit (22) and creates a PLL oscillator test data table (81) showing the RF generator (2) bandwidth and pass or fail indicator.

In regard to overall test status of the RF generator (2) under test, the second processor unit (27) executes the graphical user interface module (65) and waits for the overall test status to be received from the first processor unit (22) and displays on the display surface (29) an overall test dialog (82) that indicates a pass or fail of the RF generator (2) under test.

Figure 8:
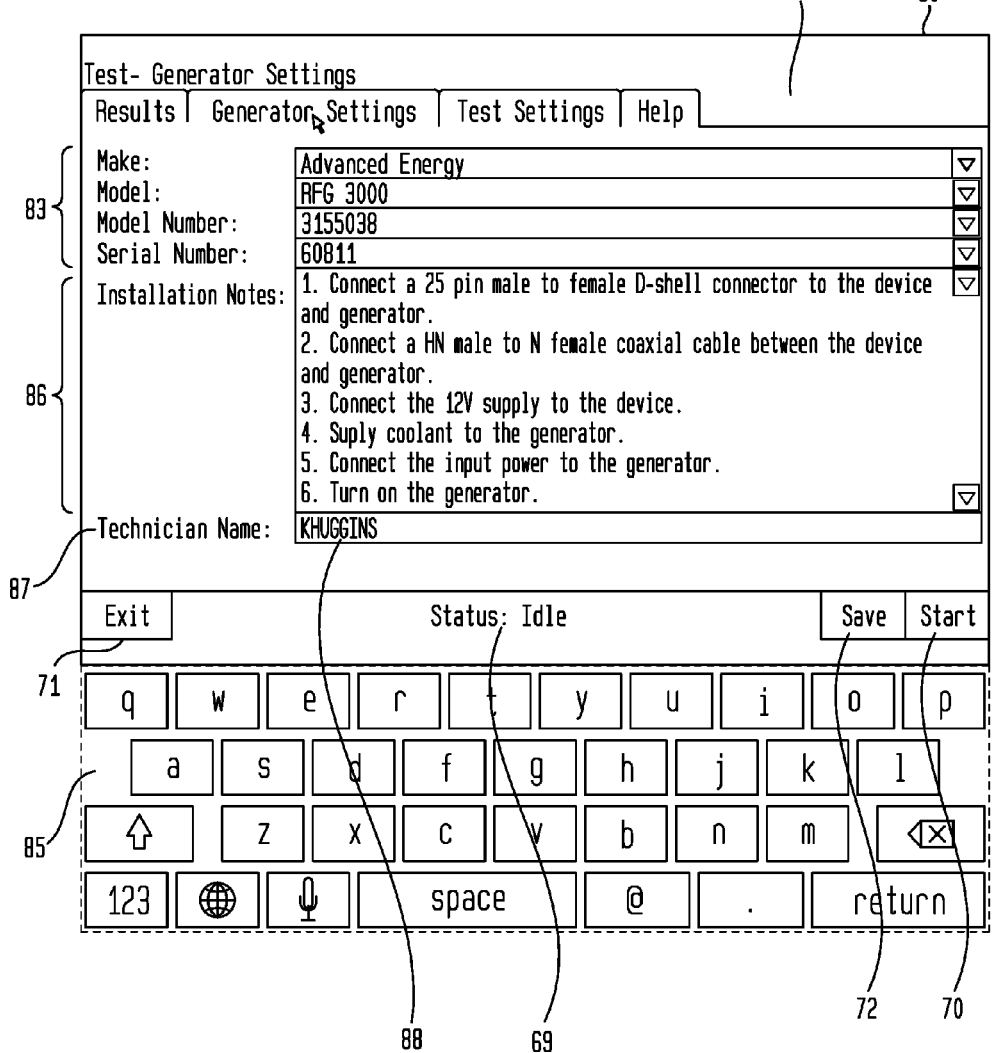
FIG. 8 illustrates an example of a user interface display screen, including a generator settings page and a keyboard shown in broken line to input data for conducting a performance analysis of a radio frequency generator.
Figure 9:
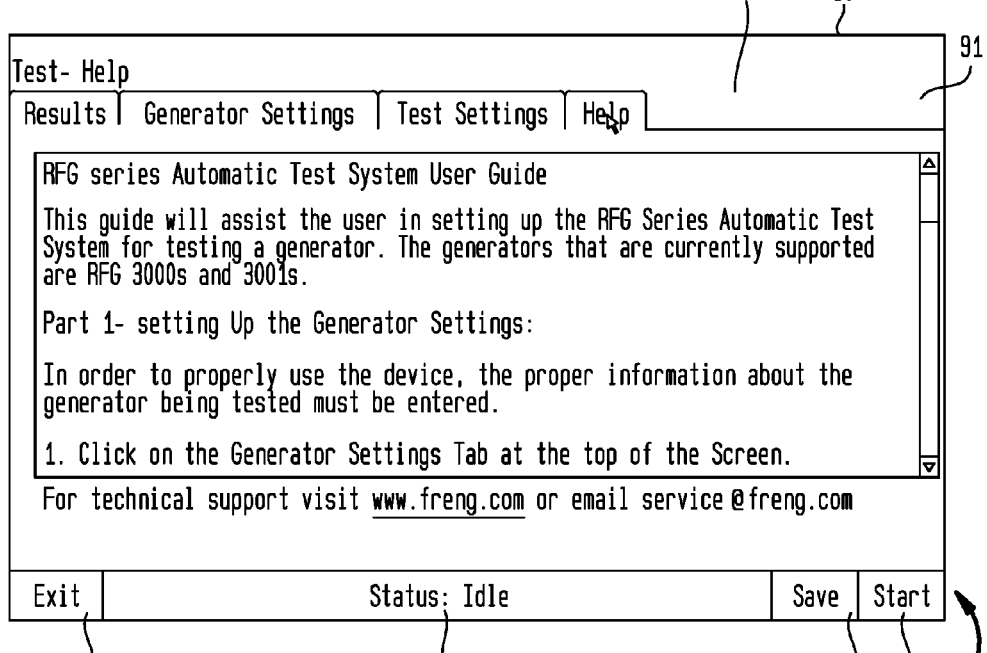
FIG. 9 illustrates an example of a user interface display screen, including a help page showing troubleshooting information for conducting a performance analysis of a radio frequency generator.

In some implementations, the second processor unit (27) executes the graphical user interface module (65) in response to user interaction with the interface page selection bar (66) to display a generator settings page (82) (as shown in the example of FIG. 8) and further functions to load the RF generator's (2) manufacturer information from a configuration file (75) selected by user interaction in a scroll bar (83) which once clicked displays RF generator (2) manufacturer that the user (31) can select and open a keyboard widget (84) that displays a keyboard (85) allowing the user to input a new generator manufacturer if not listed. Similarly, the second processor unit (27) loads RF generator's (2) model family name from a configuration file (75) selected by user interaction in a scroll bar (83) which once clicked displays RF generator (2) models that the user can select and open a keyboard widget (84) that displays a keyboard (85) which allows the user (31) to input a new RF generator (2) model if not listed. The second processor unit (27) further functions to load the RF generator's (2) model and revision numbers from the configuration file (75) based on the RF generator (2) make and model that has been selected and waits for the scroll bar (83) to be clicked by the user (31) and once clicked, displays RF generator (2) model numbers that the user (31) can select and opens a keyboard widget (84) which displays a keyboard (85) which allows the user (31) to input a new RF generator (2) model number if not listed. Similarly, the second processor unit (27) further functions to load RF generator (2) serial numbers from the configuration file (75) based on the make, model, and model number selected and waits for the scroll bar (83) to be clicked by user (31) interaction. Once clicked, RF generator (2) serial numbers are displayed which the user (31) can select and open a keyboard widget (84) that allows the user (31) to input a new RF generator (2) serial number. The second processor unit (27) can further function to display installation notes (86) based on the RF generator (2) make and model selected and can further display a technician text field (87) and open a keyboard widget (84) which displays a keyboard (85) that allows the user (31) to enter a technician name (88) into the technician text field (87).

In some implementations, the second processor unit (27) can further execute the graphical user interface module (65) to display a test settings page (89) on the display surface (30) of the RF generator test apparatus (1). In regard to the RF pulse test (50), the second processor unit (27) further executes the graphical user interface module (65) to load a default threshold percentage based on the RF generator (2) make and model selected on the generator settings page (82). In regard, to the VSWR trip point test (53), the second processor unit (27) executes the graphical user interface module (65) to load a default maximum fold back based on the RF generator (2) make and model selected on the generator settings page (82).

In some implementations, the second processor unit (27) further functions by user interaction with the page selection bar (66) to display a help page (90) on the display surface (30) of the RF generator test apparatus (1). The help page (90) displays RF generator test apparatus setup instructions (91) based on the RF generator (2) make and model selected by user interaction in the generator settings page (82) and further displays troubleshooting tips (91) for the user (31).

In some implementations, the second processor unit (27) further functions to initialize a connection to a TCP server (92) on first processor unit (22) and starts a thread for reading test data and waits for data to be received from the TCP server (92) on the first processor unit (22) and passes test data to the parse data function and writes test data to the TCP server (92) on the first processor unit (22) and further functions to read the incoming test data and parses it into useable data and sends the data to the proper test display functions.

In some implementations, the second processor unit (27) further executes a real time clock module (93) to display a clock text field (94) on the display surface (30) of the RF generator test apparatus (1) and prompts the user (31) to enter the current time and date in the form of (HH:MM:SS Day of the Week MM/DD/YYYY) and queries if the time format is 24-hour or 12-hour. If the time is 12-hour, it asks if AM or PM. The second processor unit (27) further functions to convert the user (31) input to binary coded decimal and writes the data to the real time clock module. The second processor unit (27) further functions to pull the data from the real time clock module (93) and converts the data from binary coded decimal to decimal and displays the time in the following format (HH:MM:SS AM/PM Day of the Week, MM/DD/YYYY). On start-up, the second processor unit (27) further functions to pulls the current date and time from the real time clock module and sets the computer clock (96) to the gathered time and date and sends the data to the first processor unit (22) in order to synchronize clocks.

As can be easily understood from the foregoing, the basic concepts of the present invention may be embodied in a variety of ways. The invention involves numerous and varied embodiments of a system for conducting a performance analysis of a radio frequency generator and methods for using such a system and the component parts including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "radio frequency generator" should be understood to encompass disclosure of the act of "generating a radio frequency"—whether explicitly discussed or not—and, conversely, were there effectively disclosure of the act of "generating a radio frequency", such a disclosure should be understood to encompass disclosure of "radio frequency generator" and even a "means for generating a radio frequency." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the systems for conducting a performance analysis of a radio frequency generator disclosed and described, ii) the related devices and methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An apparatus, comprising:
a directional coupler to isolate one or more analog signal frequencies correlated to a radio frequency forward signal and a radio frequency reflected signal of a radio frequency generator under test;
a first detector which receives the radio frequency forward signal and generates a first analog voltage output which varies proportional to a level of the radio frequency forward signal;
a second detector which receives the radio frequency reflected signal and generates a second analog voltage output which varies proportional to a level of the radio frequency reflected signal; and
a first processor communicatively coupled to a first memory, the first memory storing instructions that, when executed, cause the first processor to collect, process, and analyze data from the radio frequency generator under test in the form of one or more performance tests.

2. The apparatus of claim 1, further comprising an analog processor.

3. The apparatus of claim 2, further comprising a read-only memory, the read-only memory storing instructions that, when executed, cause the analog processor to read stored signal characteristics.

4. The apparatus of claim 3, further comprising a second processor communicatively coupled to a second memory, the second memory storing instructions that, when executed, cause the second processor to establish communication with a graphical user interface of the apparatus, the graphical user interface adapted to display one or more test results of the one or more performance tests.

5. The apparatus of claim 4, further comprising a first band-pass filter for receiving the radio frequency forward signal from the directional coupler.

6. The apparatus of claim 5, further comprising a second band-pass filter for receiving the radio frequency reflected signal from the directional coupler.

7. The apparatus of claim 6, further comprising a first attenuator for receiving the radio frequency forward signal from the first band-pass filter.

8. The apparatus of claim 7, further comprising a second attenuator for receiving the radio frequency reflected signal from the second band-pass filter.

9. The apparatus of claim 8, further comprising multiple resistors, each resistor being electrically connected in parallel along a radio frequency signal pathway to provide a non-reactive load.

10. The apparatus of claim 9, further comprising a relay in series with the radio frequency signal pathway between the directional coupler and the multiple resistors.

11. The apparatus of claim 7, wherein the one or more programming modules comprises:
an interlock test;
an on/off status of an alternating current test;
an on/off status of the radio frequency signal test;
a setpoint status alarm test; and
an over temperature alarm test.

12. The apparatus of claim 10, wherein the one or more programming modules comprises:
a radio frequency pulse test;
a voltage standing wave ratio trip point test; and
a phase locked loop oscillator test.

13. The apparatus of claim 4, wherein the display of the one or more test results comprises:
- a page selection bar; and
- a menu bar, the menu bar comprising a test status indicator, a start button, an exit button, and a save button.

14. The apparatus of claim 12, wherein the display of the one or more test results comprises:
- a radio frequency pulse test table;
- a voltage standing wave ratio trip point test table;
- a phase locked loop oscillator test table; and
- in-line process monitoring data.

15. The apparatus of claim 14, wherein the display of the one or more test results comprises an overall test dialog that indicates a pass or fail of the radio frequency generator under test.

* * * * *